(12) United States Patent
Proctor et al.

(10) Patent No.: US 8,250,579 B2
(45) Date of Patent: Aug. 21, 2012

(54) METHOD FOR STAGE-BASED COST ANALYSIS FOR TASK SCHEDULING

(75) Inventors: Seth Proctor, Concord, MA (US);
David Jurgens, Burlington, MA (US);
James Megquier, Somerville, MA (US)

(73) Assignee: Oracle America, Inc., Redwood City, CA (US)

( * ) Notice: Subject to any disclaimer, the term of this patent is extended or adjusted under 35 U.S.C. 154(b) by 1068 days.

(21) Appl. No.: 12/163,324

(22) Filed: Jun. 27, 2008

(65) Prior Publication Data
US 2009/0328046 A1 Dec. 31, 2009

(51) Int. Cl.
*G06F 9/46* (2006.01)
*G06F 9/44* (2006.01)
*G06F 9/45* (2006.01)

(52) U.S. Cl. ........ 718/102; 718/100; 718/101; 718/103; 717/127; 717/130; 717/131; 717/132; 717/133; 717/158

(58) Field of Classification Search .................. None
See application file for complete search history.

(56) References Cited

U.S. PATENT DOCUMENTS

| | | | |
|---|---|---|---|
| 5,524,077 A | 6/1996 | Faaland et al. | |
| 5,745,687 A * | 4/1998 | Randell | 709/201 |
| 5,798,950 A * | 8/1998 | Fitzgerald | 703/17 |
| 6,170,083 B1 * | 1/2001 | Adl-Tabatabai | 717/158 |
| 6,393,433 B1 * | 5/2002 | Kalavade et al. | 718/106 |
| 6,438,704 B1 | 8/2002 | Harris et al. | |
| 6,804,249 B1 | 10/2004 | Bass et al. | |
| 6,986,137 B1 | 1/2006 | King et al. | |
| 7,007,276 B1 | 2/2006 | Kubala et al. | |
| 7,010,788 B1 * | 3/2006 | Rehg et al. | 718/100 |
| 7,072,805 B2 * | 7/2006 | Cascaval et al. | 702/196 |
| 7,073,175 B2 | 7/2006 | Rehg et al. | |
| 7,159,221 B1 | 1/2007 | Willen et al. | |
| 7,289,939 B2 * | 10/2007 | Cascaval et al. | 702/196 |
| 7,293,260 B1 * | 11/2007 | Dmitriev | 717/130 |
| 7,325,234 B2 * | 1/2008 | Smith | 718/104 |
| 7,461,380 B2 | 12/2008 | Nishimura | |

(Continued)

OTHER PUBLICATIONS

Ravi Sethi, Programming Languages Concepts and Constructs, 1990, 212, Addison-Wesley Publishing Company, US.

(Continued)

*Primary Examiner* — Meng An
*Assistant Examiner* — Bing Zhao
(74) *Attorney, Agent, or Firm* — Polsinelli Shughart PC (57) ABSTRACT

One embodiment may estimate the processing time of tasks requested by an application by maintaining a state-model for the application. The state model may include states that represent the tasks requested by the application, with each state including the average run-time of each task. In another embodiment, a state model may estimate which task is likely to be requested for processing after the current task is completed by providing edges in the state model connecting the states. Each edge in the state model may track the number of times the application transitions from one task to the next. Over time, data may be gathered representing the percentage of time that each edge is from a state node. Given this information, the scheduler may estimate the CPU cost of the next task based on the current state, the most likely transition, and the cost of the predicted next task. The state model may also track multiple users of the application and modify or create the state model as the users traverse through the state model.

16 Claims, 5 Drawing Sheets

U.S. PATENT DOCUMENTS

| | | | |
|---|---|---|---|
| 7,548,335 B2 | 6/2009 | Lawrence et al. | |
| 7,647,585 B2 * | 1/2010 | Sun | 717/128 |
| 7,676,483 B2 * | 3/2010 | Klug | 703/6 |
| 7,689,998 B1 | 3/2010 | Chrysanthakopoulos | |
| 7,761,875 B2 | 7/2010 | Karamanolis et al. | |
| 7,802,236 B2 * | 9/2010 | Calder et al. | 717/130 |
| 7,904,324 B2 | 3/2011 | Gura | |
| 8,005,705 B2 | 8/2011 | Gura et al. | |
| 8,010,396 B2 | 8/2011 | Gura | |
| 2003/0066055 A1 * | 4/2003 | Spivey | 717/131 |
| 2003/0172104 A1 | 9/2003 | Hooman et al. | |
| 2003/0233341 A1 * | 12/2003 | Taylor et al. | 707/1 |
| 2004/0015973 A1 | 1/2004 | Skovira | |
| 2004/0054999 A1 | 3/2004 | Willen et al. | |
| 2004/0216013 A1 * | 10/2004 | Sun | 714/45 |
| 2005/0021712 A1 | 1/2005 | Chassapis et al. | |
| 2005/0065826 A1 | 3/2005 | Baker et al. | |
| 2005/0081200 A1 | 4/2005 | Rutten et al. | |
| 2007/0220294 A1 | 9/2007 | Lippett | |
| 2007/0220517 A1 | 9/2007 | Lippett | |
| 2008/0002584 A1 | 1/2008 | Leng | |
| 2008/0163183 A1 | 7/2008 | Li et al. | |
| 2008/0235693 A1 | 9/2008 | Proctor et al. | |

OTHER PUBLICATIONS

Richard Fairley, Software Engineering Concepts, 1985, 108-108, McGraw-Hill, Inc., US.

Fairly, "Software Engineering Concepts", 1985, pp. 106-109, McGraw-Hill, Inc.

Kwok et al., "Static Scheduling Algorithms for Allocating Directed Task Graphs to Multiprocessors", ACM Computing Surveys, vol. 31, No. 4, Dec. 1999, pp. 1-66.

Liu et al., "On Means to Provide Flexibility in Scheduling", 1988, ACM, pp. 32-34.

Sethi, "Programming Language Concepts and Constructs", 1990, Addison-Wesley Publishing Company, p. 212.

Sutton et al., "Reinforcement Learning: An Introduction", 1998, MIT Press.

Amendment and Response regarding U.S. Appl. No. 11/726,830, Feb. 25, 2011.

Amendment and Response regarding U.S. Appl. No. 11/726,830, Jun. 14, 2011.

Final Office Action regarding U.S. Appl. No. 11/726,830, Mar. 14, 2011.

Non-Final Office Action regarding U.S. Appl. No. 11/726,830, Oct. 27, 2010.

Non-Final Office Action regarding U.S. Appl. No. 12/045,064, Jul. 8, 2011.

Amendment and Response regarding U.S. Appl. No. 12/045,064, Oct. 10, 2011.

Notice of Allowance regarding U.S. Appl. No. 12/045,064, Nov. 28, 2011.

* cited by examiner

Figure 1

--Prior Art--

METHOD FOR STAGE-BASED COST ANALYSIS FOR TASK SCHEDULING

FIELD OF THE INVENTION

Aspects of the invention relate, in general, to task scheduling, and more particularly to the scheduling of computing tasks within a software computing environment.

BACKGROUND

In a typical computing environment, one or more software applications may run concurrently with each application likely having numerous tasks requiring access to the CPU for the processing of these tasks. Further, each concurrent application may each have any number of concurrent threads competing for CPU access. For example, in an object-oriented application running inside a Java Virtual Machine ("VM"), a task may include a call to a method, the creation of an object instance, or a mathematical calculation. Each of these tasks would require access to the CPU for processing, as would tasks from the other applications in the environment.

In order for a CPU to handle the volume of tasks vying for processing time, a scheduler is often used. Most operating systems ("OS") include one or more internal task schedulers to manage and prioritize the tasks needing resources from the CPU. The primary function of such a scheduler is to intercept CPU requests from the various applications for their desired tasks and prioritize which tasks will run in what order.

Figure 1:
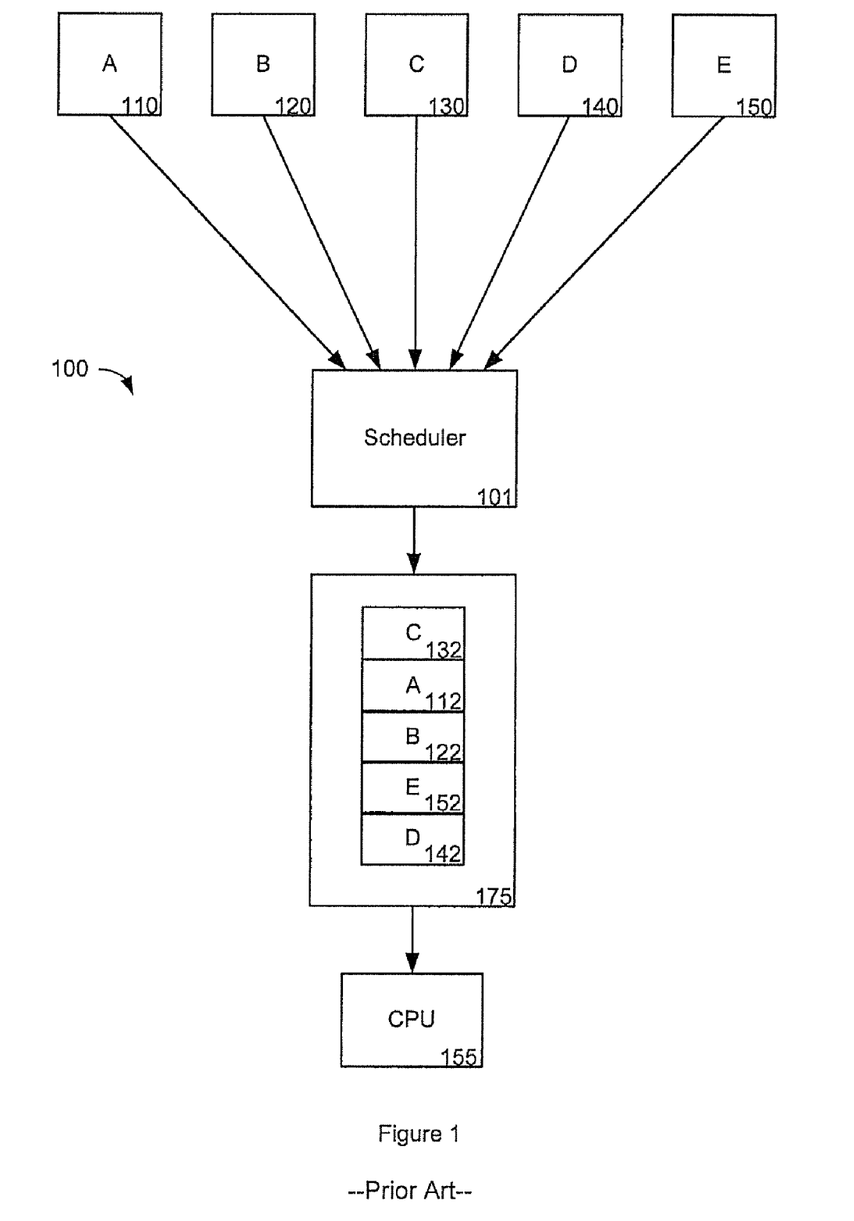
FIG. 1 is a block diagram illustrating a typical task scheduler included in an operating system.

FIG. 1 is a block diagram illustrating a typical task scheduler included in an OS. In the computing environment 100, task scheduler 101 is responsible for receiving requests from applications running on the OS for tasks A-E for access to CPU 155. Tasks A-E may be requested by one application running in the computer environment 100 or may be requested by several applications. The scheduler 101 may simultaneously receive CPU requests to perform tasks A 110, B 120, C 130, D 140 and E 150. Scheduler 101 may use one or more algorithms to determine the priority in which the tasks will be performed. Once a priority is determined, the tasks are moved into a queue 175 to await their turn for access to the CPU 155. In this example, task D 142 is placed into the queue 175 first, followed by task E 152, task B 122, task A 112 and task C 132. Once placed in the queue 175, task D 142 will have access to CPU 155 first. Once task D 142 begins processing by CPU 155, the task leaves the queue 175, resulting in task E 152 becoming first in line. In the meantime, it is likely that additional tasks (not shown) have requested access to the CPU 155. The scheduler 101 will continue executing the one or more algorithms to determine the priority of each task requesting access to the CPU 155.

Much of the difficulty of efficiently scheduling tasks is maintaining adequate distribution of CPU time amongst the applications needing CPU services. In other words, if there are five applications running at once, the scheduler should maintain fairness by scheduling tasks from all five applications such that no one application is given too much or too little CPU time. The notion of fairness may be defined in the context of a specified deployment of one or more applications.

In some computer environments, a scheduler may maintain fairness by time-slicing or otherwise parsing the requesting tasks to ensure that each task is performed equally. For example, in a router environment, the scheduler may read the first 100 bytes of a first incoming packet and send it to the CPU for processing. The scheduler may then read the first 100 bytes of a second incoming packet and send that packet to the CPU. In this manner, the scheduler may continue to cycle through the incoming packets, 100 bytes at a time to process the packets. Thus, each packet receives equal processing time with no single packet delaying the processing of the other packets. Similarly, in a multithreaded processing environment, the scheduler may time-slice each task to run on each thread for 200 milliseconds. Thus, the scheduler maintains fairness in the amount of processing time each task receives by providing the same amount of processing time on each thread.

However, in some computing environments, the tasks requesting processing time on the CPU cannot be time-sliced. These tasks, once started, must continue until finished. Using the example of FIG. 1, task D 142 must be completed before task E 152 can begin. Thus, in a single-processor system in this environment, only a single task can run at one time. Multi-processor, multi-core and multi-threading environments allow for multiple tasks to run concurrently. However each processor core is still limited to running a single task at a time. Thus, if a certain task requires a significant amount of time to process, the processor would be unable to process other important tasks until the current task is completed. This may delay applications accessing the processors, freezing the applications until the tasks of other applications are processed.

While some computing environments may accept the freezing of the application, other environments may require a low-latency execution of the requested tasks. One example of such an environment is a Massive Multi-player Online Role Playing Game ("MMORPG") environment. Because the enjoyment of the online game may relate to how smoothly the game is presented to the online game player, it may be necessary to provide a low-latency configuration such that the online game does not freeze during gameplay.

One approach for ensuring scheduling fairness in a computing environment where tasks cannot be time-sliced is to provide the scheduler with the time required to process the task when the task is requested. For example, a task may be called by an application to be processed on the CPU that requires 3 milliseconds of time. The scheduler may intercept the request and schedule 3 milliseconds of time on the CPU. In this manner, the scheduler may prioritize the tasks to efficiently complete each task without reserving the CPU for too long a time. However, this approach requires the application to provide the processing time for each task when the task is requested, resulting in longer processing time for the application and more complex application design.

SUMMARY

What is needed, amongst other things, is a method to predict the amount of time a certain task will require to be processed so that a scheduler may order the processing of the tasks more efficiently without the need of the application to provide run-time information when the task is requested. Such a method may provide information to a scheduler to minimize latency for applications running in task-driven environments.

One embodiment may be a computer implemented method for scheduling tasks. The method may include receiving a task request from an application where the task may be requesting execution by a central processing unit (CPU). The task may further have a signature representing at least one call to a method with an application programming interface (API). The method may also estimate an execution time for the task based on at least one execution metric stored in a state model for the application, where the state model is representative of a plurality of requested tasks by the application.

A second embodiment may be a system for scheduling tasks in a computing environment. The system may include a computing application hosted on a first server. The system may also include a task scheduler in communication with the computing application with the task scheduler able to schedule tasks requesting execution by a central processing unit (CPU). A scheduling queue in communication with the scheduler may also be included, with the scheduling queue able to store tasks waiting execution by the CPU. The system may also include a state model in communication with the computing application and the task scheduler, with the state model having a plurality of execution states representative of the computing application. An execution state may represents a location where a user may exist within the computing application. The state model may further have at least a first edge attached to a first execution state, with the edge representative of a transition from the first execution state to a second execution state.

DETAILED DESCRIPTION

In one embodiment, the running time of a task may be estimated by creating a state-model for an application based on the average amount of time the tasks have required in the past. The state model may include states that represent the tasks requested by the application, with each state including the average run-time of each task. As previously mentioned, one problem with current schedulers is their ability to estimate run time for tasks that are being queued for CPU processing time. Thus, efficient scheduling of tasks may benefit from pre-knowledge of the potential run-time of each task, as well as the likely order in which the tasks will be requested, among other things.

In another embodiment, a state model may estimate which task is likely to be requested for processing after the current task is completed. For example, the state model may note that an application generally requests that task B be processed after task A. The transition from one task to the next, or one state of the state model to the next, may be referred to as an edge. Each edge in the state model may track the number of times the application transitions from one task to the next. Over time, data may be gathered representing the percentage of time that each edge is from a state node. For example, if a state node has 3 edges, data may be gathered showing that edge one is followed 80% of the time, with edges two and three each followed 10% of the time. Based on this information, any time a user is at the state node, the scheduler may assume edge one will be followed after the current task is completed. Given this information, the scheduler may estimate the CPU cost of the next task based on the current state, the most likely transition (e.g., edge one), and the cost of the predicted next task.

In yet another embodiment, the state model may also track other metrics that may assist the scheduler in scheduling requested tasks. For example, the state model may track the type of object that a programmer used to run the task, the type of event that triggered the task (packet arrival from the client, message from another server, timeout, etc.), or other criteria available within the system. The scheduler may use this information to make the run-time predictions more accurate.

One advantage of the above approach to generate an input for scheduling tasks is that a programmer is not required to provide run-time or other metric information for each task at the time the application requests CPU time. In contrast, the scheduler is able to gather such information from run-time profiling through the assistance of the state model. Such an approach allows programmers to focus on the writing of the application without concern for additional code to assist the scheduler.

An additional advantage of scheduling tasks based on run-time profiling is the ability of the state model to provide debugging information to programmers. For example, a given task may consistently take 80 ms to execute. However, the programmer of the application may be unaware of the execution time of the task. Thus, the run-time information about each task requested by the application may be provided to the programmer to debug the task and the method calls it makes. Thus, the information provided by the state model may allow a programmer to streamline the application design.

The method may be applied in many computing environments. For example, the method may aid in the scheduler of a server. Alternatively, the method may also be applied to a cluster of servers, making the scheduling of the tasks among the cluster of servers more efficient. Latency-sensitive computing environments may also benefit from the described method. One example of a latency-sensitive environment is in Massive Multi-player Online Role Playing Game ("MMORPG") environments. Because the enjoyment of the online game may relate to how smoothly the game is presented to the online game player, a low-latency configuration of the online game may be employed such that the online game does not freeze during gameplay. An example of an MMORPG environment that may benefit from the method would be World of Warcraft™ by Blizzard Entertainment.™

It should be noted that, although the embodiments described herein store the execution time of the requested tasks in the state model, various other metrics may also be maintained by the state model to provide to a scheduler for more efficient scheduling of tasks. For example, the state model may also store which objects the requested task may access, whether the task may send a message to a client, whether the task tends to create conflicts, and so on. The run-time execution of the requested task is just one example of a performance metric that may be stored by the state model. Generally, the embodiments described may observe any number of details about the requested tasks and provide those details to a scheduler for more efficient scheduling of the tasks.

Figure 2:
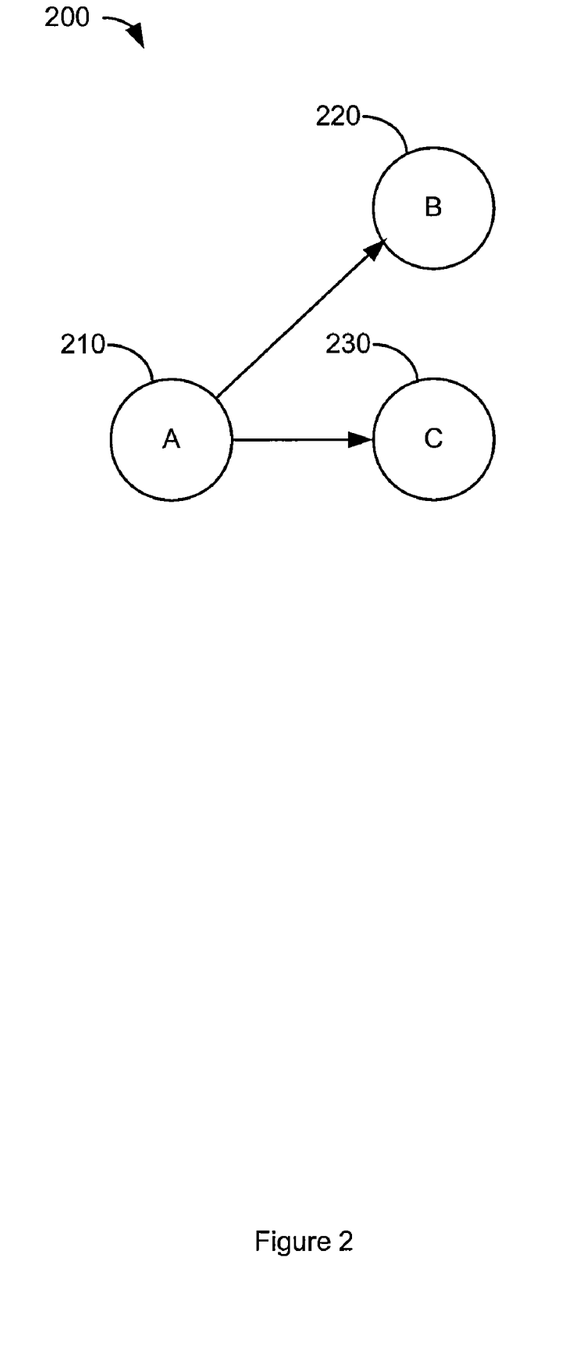
FIG. 2 illustrates a state model graph representing one embodiment of the method.

FIG. 2 illustrates a state model 200 graph representing one embodiment of the method. As described above, the embodiment may estimate the running time of a task requested by an application based on the average time to process the task in the past. Further, the embodiment may also estimate which task will likely be requested next by the application once the current task is completed. In this manner, the embodiment may create a state model 200 for an application to map the estimated time to process each task requested by the application, as well as the likely series of tasks the application will request.

In FIG. 2, each task requested by the application is represented by the states of the state model 200. For example, state A 210 represents a task requested by the application. As described in more detail below, each task within the state model 200 may be identified by a task signature.

In a typical software application, a task may call a series of any number of methods from a provided application programming interface ("API"). During execution of a single task, each call to a method in the provided API may be noted. When the task completes, the scheduler may combine the noted API calls made by the task to compute a number. This number may be used by the embodiment as the signature of the task. For example, a task may make the following series of requests from the API: read an object, read an object, write an object, send a message, schedule a task, schedule a task and write an object. This series of calls may be noted by the embodiment and a number may be generated by the series of calls. For example, a string may be generated that identifies the Java class type of the task being run followed by each API call identified in order by a number assigned to each method. Another possible method may be to generate a string that identifies the Java class type of the task being run and hash the string on completion of the task. The hash value of the string could then be used as the signature. The generated number may then be associated with the task as the task signature. Thus, any time the same series or a similar series of calls is made to the API by the application, the embodiment may recognize the series of calls as the signature of the task.

In this manner, a series of tasks, identified by their signatures, may be recognized in the state model 200. As new tasks are requested by the application and their signatures identified, new states may be added to the state model 200. For example, a new application supported by the API may begin with no states in the state model. As the application requests tasks from the API, the state model may create states for each task signature recognized by the embodiment. Any number of states may be created within the state model for the application.

Returning to FIG. 2, several states or tasks have been recognized by the state model 200. For example, state A 210 represents a task with a unique signature. Similarly, state B 220 and state C 230 represent separate tasks with unique signatures. As an application requests tasks, the state model 200 may be generated. For example, a new task requested by the application would be represented in the state model 200 with a new state. Thus, tasks A 210, B 220 and C 230 are separate tasks with unique task signatures that the application has previously requested to be processed.

Further, for each task in the state model 200, the embodiment may retain timing information to process each task. At each state node within the state model 200, the state model 200 may track the time that the represented task takes to execute (i.e., the stream of API calls represented by the task). For example, for task A 210, the state model 200 may average the time necessary to complete the task. Thus, assume task A has been processed three times, requiring 10 ms, 13 ms and 7 ms. The state model 200 may calculate and note the average time required to run task A 210 in the past, in this case 10 ms. The execution time may be re-computed with each successive execution. By knowing the average execution time of a given task and its API calls, the state model 200 may predict the amount of CPU time needed when the task requests the CPU in the future, thus allowing for more efficient scheduling of tasks.

Figure 3:
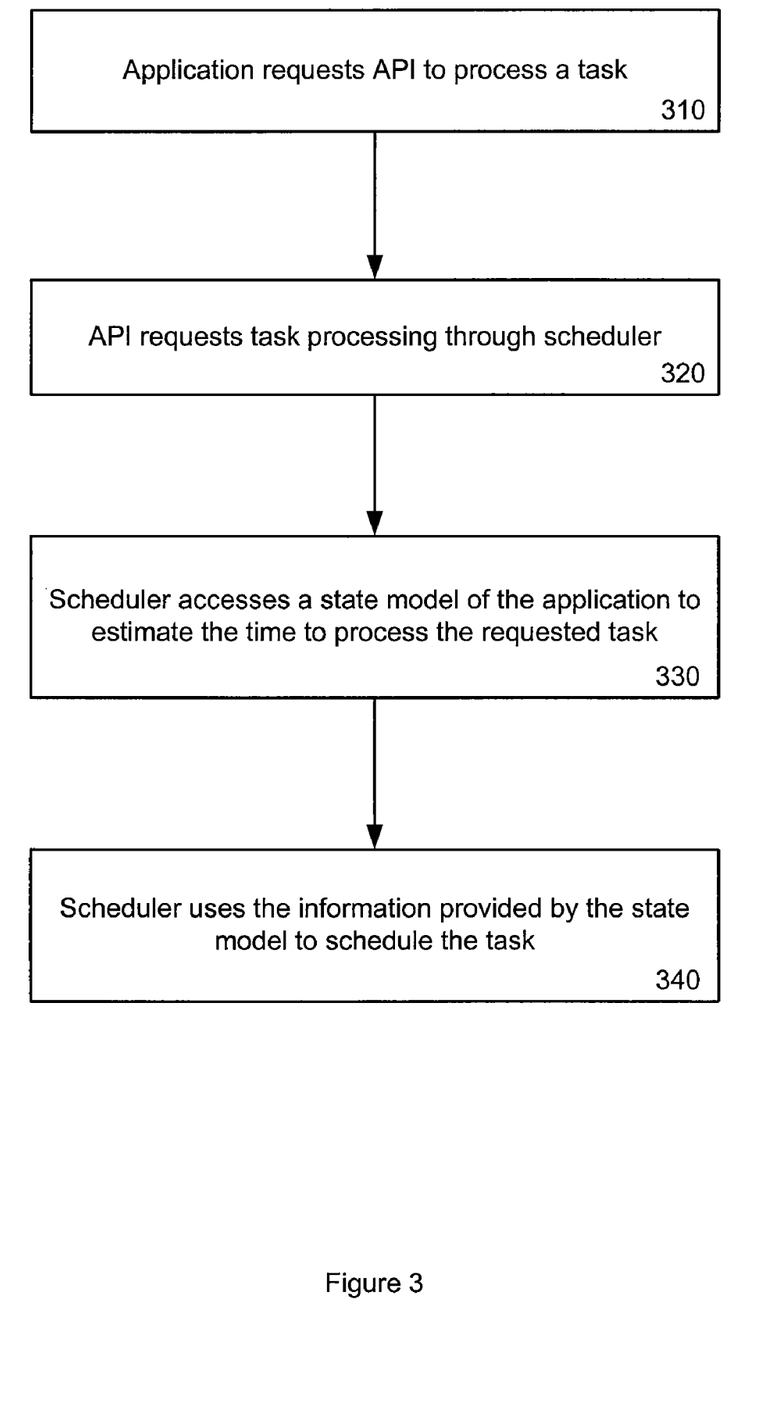
FIG. 3 is a flow chart illustrating a scheduler utilizing the information provided by the first embodiment to schedule a task requesting CPU processing time.

FIG. 3 is a flow chart illustrating a scheduler utilizing the information provided by the first embodiment to schedule a task requesting CPU processing time. In operation 310, the application may request the API to process a task. In operation 320, the API may request the task be processed through a scheduler.

In operation 330, the scheduler may access a state model of the application to predict the processing time of the requested task. For example, assume that task A 210 of FIG. 2 is requested by the application. Associated with task A 210 in the state model 200 is the average processing time for that task. In one example, the average processing time may be 10 ms. This information may be provided to the scheduler by the state model 200 when the task is requested by the application.

In operation 340, the scheduler may use the information provided by the state model 200 to predict the processing time of the requested task. The scheduler may assume that the requested task will require the average processing time for that task. Thus, the scheduler may use the average processing time to schedule the requested tasks such that each task does not dominate the processor at the expense of other tasks. The scheduler may also receive other performance metrics concerning the tasks associated with each state from the state model. These other metrics may provide further information about the requested tasks to better predict the performance of each task. By providing this information to the scheduler, the embodiment may reduce the latency each application may experience waiting for their tasks to be processed.

It should be noted that the average execution time provided to the scheduler is not required to be completely accurate. A scheduler receiving the execution time from the embodiment may utilize many different algorithms to determine when each requested task is scheduled. Thus, the scheduler may assume that the average execution time provided by the embodiment is an approximation the execution time and may schedule the task accordingly. For example, the execution time provided by the embodiment may be 10 ms to complete the task. The scheduler may use this information to schedule 15 ms with the CPU for the requested task to account for the possibility of the task requiring more than 10 ms to complete. As stated above, the scheduler may utilize any algorithm to schedule the requested tasks in response to the metric information provided by the embodiment.

Figure 4:
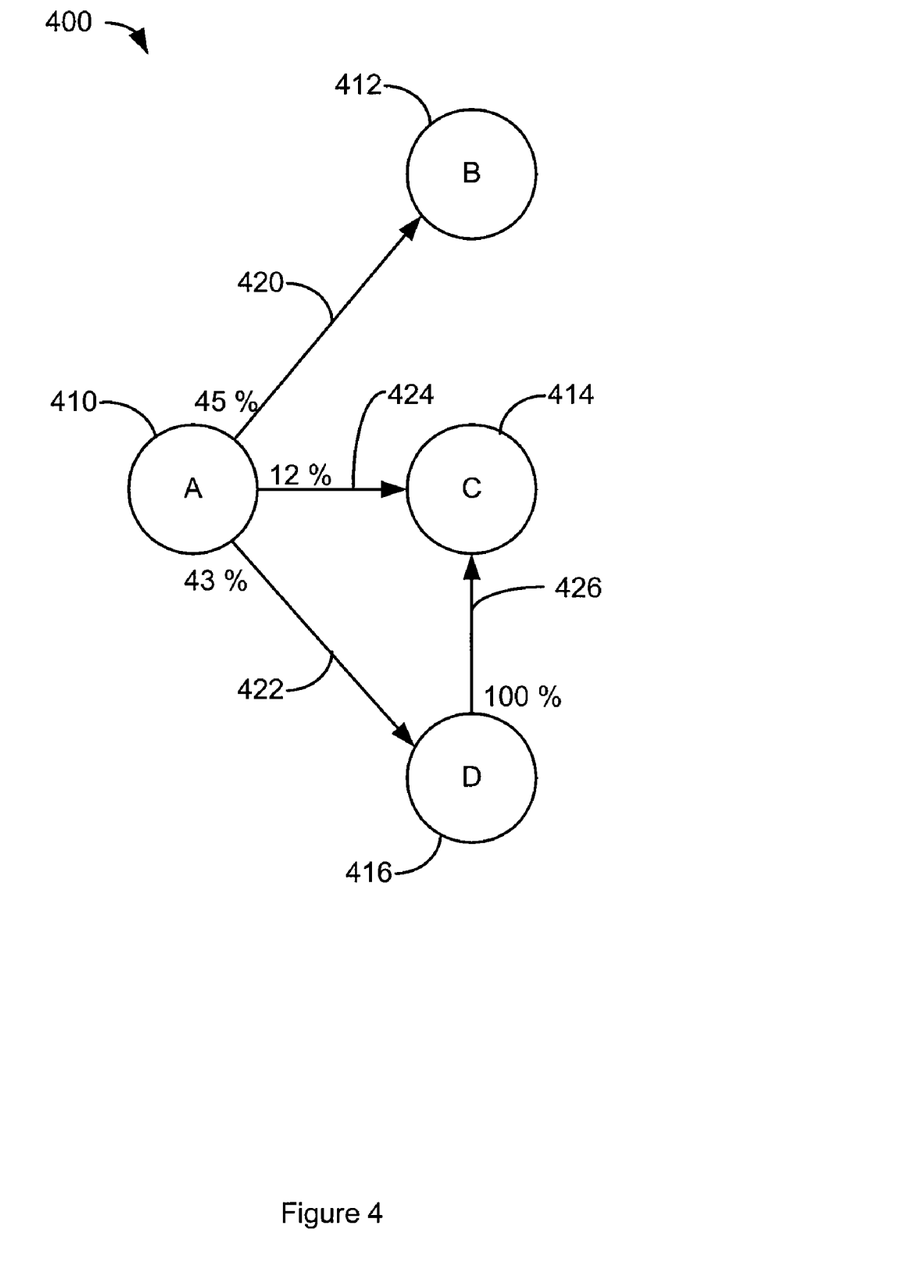
FIG. 4 is a state model graph representing a second embodiment of the method illustrating the edges of the state model.

As mentioned above, the state model for an application may also track which tasks are generally requested for processing after the current task is completed. FIG. 4 is a state model graph representing a second embodiment of the method illustrating the edges of the state model. By noting the edges of the state machine, the second embodiment may provide an predict to a scheduler on the next task likely to be requested by the application.

As described above with reference to FIG. 2, a state model may contain each task requested by the application, identified by the task signature. In FIG. 4, tasks A-D 410-416 have been identified and noted in the state model 400. The state model 400 may also contain edges 420-426 between the different states of the state model 400. The edges 420-426 represent the order in which tasks have been requested by the application. For example, task A 410 has three edges 420-424 connecting task A 410 to other tasks. Thus, the application represented by the state model 400 has, in the past, requested task A 410, then has requested one of the three other tasks connected to task A 410 by an edge, namely task B 412 connected to task A 410 through edge 420, task C 414 connected to task A 410 through edge 424 and task D 416 connected to task A 410 through edge 422. In other words, a request to process tasks B 412, C 414 or D 416 has followed the request to perform task A 410.

Through the state model edges, the embodiment may predict which task is likely to be requested next by the application, after task A 410 has been performed.

For tasks with multiple edges, the state model 400 may also track the likelihood of which task the application may request next. For example, task A 410 has three edges 420-424 leading from the task; one to task B 412, one to task C 414 and another to task D 416. Thus, tasks B-D 412-416 have been requested after task A 410. The state model 400 may also track how often each task has been requested after task A 410. Thus, in FIG. 4, task B 412 has been requested 45% of the time after task A 410, task C 414 has been requested 12% of the time, and task D 416 has been requested 43% of the time. Thus, the state model 400 may predict that task B 412 is the most likely to be requested next by the application. This information may be provided to a scheduler in a similar manner as described in FIG. 3 to further aid the scheduler in scheduling tasks to be processed. For example, the scheduler may assume that task B 412 will be requested next by the application, and may use the average run time for task B 412 to determine when task A 410 should be processed. The scheduler may also assume that task B 412 will be requested next by the application and begin to schedule task B 412 before the task has been requested.

It is not necessary that the scheduler assume that task B 412 will be requested after task A 410. As shown, task B 412 is requested only slightly more often than task D 416 after task A 410 is requested. Thus, the embodiment may only provide an prediction of the next task to be requested if the disparity between the percentages reaches a certain limit. Alternatively, the embodiment may provide the percentage information to the scheduler and let the scheduler decide how best to use the information to schedule the tasks. Similarly to the embodiment described above, the scheduler may utilize any algorithm to schedule the requested tasks in response to the metric information provided by the embodiment.

Further, the state model 400 may also track the number of times a task is not requested after the current task is processed. Thus, for any state in the state model 400, the percentages associated with the edges leading from the state may also reflect the percentage of the time a task is not requested after the current task. For example, state B 412 has no edges leading from that state to another state. Thus, the state model 400 may associate with state B 412 the fact that 100% of the time that task B 412 has been requested, no other task has been requested next. States with edges leading from the state may also have associated with them a similar percentage representing the number of times no task is requested after the current task.

Certain tasks may always be called after other tasks in the state model 400. For example, in the state model of FIG. 4, task C 414 has always been requested by the application after task D 416, as shown by the edge 426 leading from task D 416 to task C 414. However, another tasks that has not been identified by the application may be called after task D 410. Similar to when new tasks are recognized by the state model, the state model may also recognize new edges leading from one task to another. For example, in the event that a new task is called after task D 416, the state model 400 may create a new state and direct a new edge from task D 416 to the new task. Similarly, the state model 400 may create a new edge from task D 416 to an existing state that state is requested after task D 416. In this manner, the state model 400 of the application may be built as new tasks and edges are requested and noted in the state model. Further, the percentages corresponding to the edges of task D 416 may also reflect the newly added task.

Also, certain tasks may have no edges leading from the task. For example, task B 412 has no edges leading from it. Thus, each time task B 412 has been requested by the application, no further tasks have been requested. In one example, task B 412 may be a task associated with the user logging off of the system. In this case, the state model 400 may provide the information to the scheduler that no task will likely be requested by the application once task B 412 is requested. This information may further assist the scheduler in scheduling the requested tasks.

Figure 5:
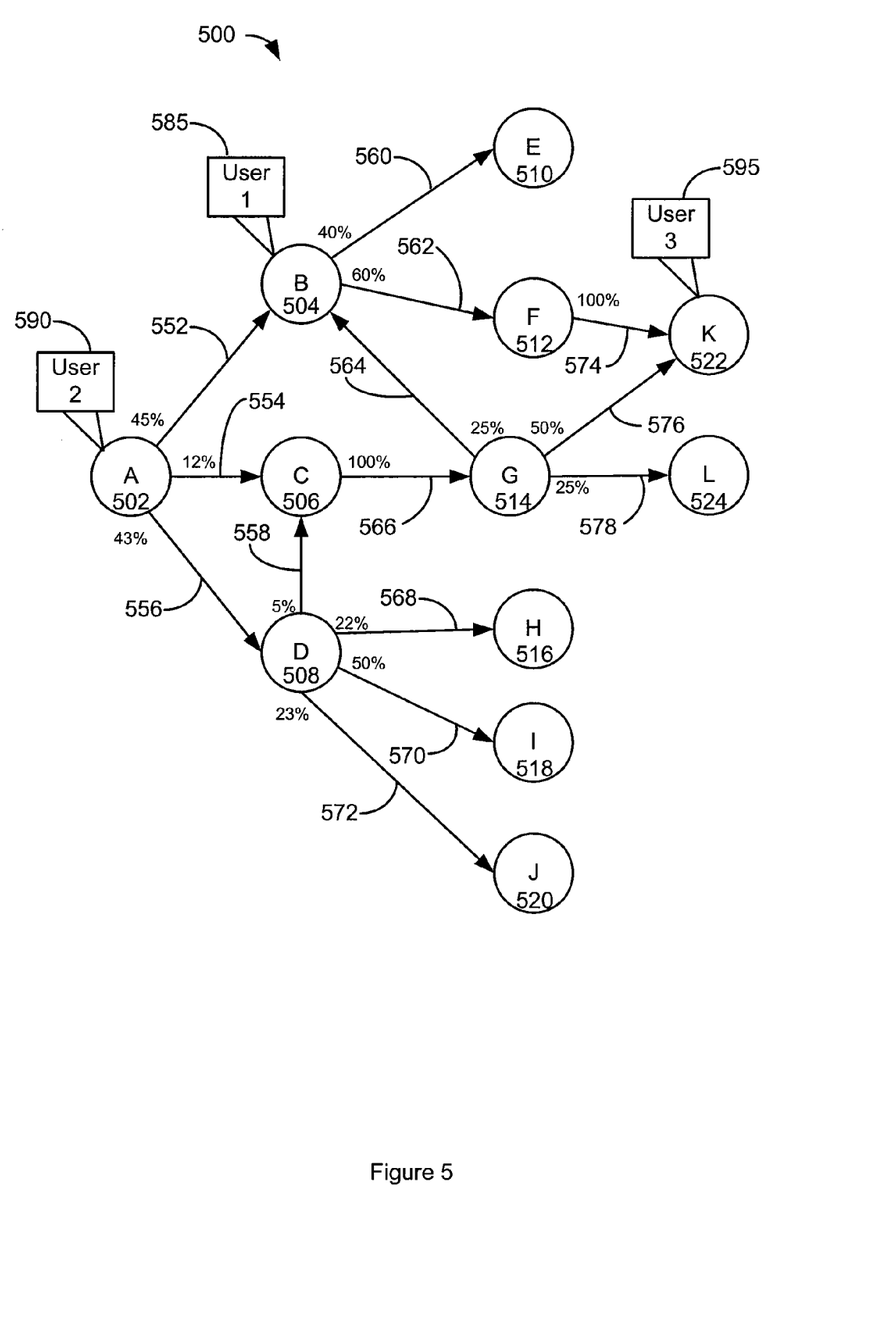
FIG. 5 depicts a state model for an application requesting tasks from an API to be processed for different users of the application.

Through the addition of states to the state model (described in reference to FIG. 2) and the tracking and addition of which tasks are requested in which order (described in reference to FIG. 4), a state model may more efficiently predict the required processing time for tasks requested by an application. FIG. 5 depicts a state model for an application requesting tasks from an API to be processed for different users of the application.

The state model 500 depicted in FIG. 5 has several tasks associated with the application, namely tasks A-L 502-524. These tasks each have a unique task signature created as described above. Further, each state may have an average processing time for each task associated with the task. Thus, when any of the tasks represented are requested by the application, a scheduler may use the information contained in the state model 500 to predict the processing time for the requested task. The state model 500 also may contain edges 552-578 between the tasks, with percentages of the likelihood that each task may be requested next by the application, as described above with reference to FIG. 4.

Thus, the state model 500 of FIG. 5 may represents all known tasks requested by the application, and may contain information about the predicted processing time for each task and the possibility of the next requested task by the application. The state model 500 may also monitor the position of several users of the application within the state model 500. For example, user 1 585 is currently located in state B 504. This means that user 1 585 has accessed the application and the application is performing task B 504 on user 1's 585 behalf. The scheduler for the API may use the information provided by the state model 500 to predict the processing time for task B 504 based on the average processing time associated with state B 504. Further, the state model 500 may determine that task E 510 and task F 512 have previously been requested after task B 504. The state model 500 may also determine the percentages that each task has been called in the past. For example, task E 510 has been requested 40% of the time, based on the information associated with edge 560. Task F 512 has been requested 60% of the time, based on the information associated with edge 562. The scheduler may use this information to efficiently schedule the tasks of the application. Thus, the scheduler may assume that user 1 585 will request task F 512 next based on the higher percentage of requests of that task in the past. Thus, the scheduler may use this information to more accurately schedule task B 504 as it is requested by the application on behalf of user 1 585, and may also begin scheduling task F 512 in preparation of the application requesting task F 512 next on behalf of user 1 585.

Similarly, the state model 500 may note that user 2 590 is located at state A 502 in the state model 500. Following the edges leading from state A 502, three tasks have been requested in the past: task B 504, task C 506 and task D 508. In the same manner described above, the scheduler may use the information associated with state A 502 to more efficiently schedule the tasks requested by the application.

The state model may further note that user 3 595 is located at state K 522 of the state model 500. In the past, no other tasks have been requested after the application has requested task K 522. Thus, the scheduler may assume that, once task K 522 is processed, user 3 595 will not request an additional task. The scheduler may use this information to possibly schedule tasks requested from other users first, based on the most important need to reduce latency in the application. The algorithm used by the scheduler to schedule the tasks may utilize the information provided by the method to more efficiently predict the processing time of the requested tasks as well as the next likely task to be requested.

While the scheduler may assume that user 3 595 will not request a task after task K 522 is complete, it is not required that task K 522 be the last task requested by user 3 595. The state model 500 of the application is based on information gathered from previous use of the applications by the users. Thus, it is possible that user 3 595 requests task E 510 after task K 522. In this case, an new edge would be created in the state model connecting task K 522 to task E 510, indicating that a user of the application has requested task E 510 after task K 522 is completed. Further, the percentages of the edges leading from task K 522 may be adjusted to reflect the addition of the new edge. It is also possible that user 3 595 requests a new task with a signature that is not recognized by the state model. In this case, the state model 500 may create a new task or state and create an edge leading from task K 522 to the new task. Through this process, the state model for the application may be updated and modified based on the tasks requested by the users of the application.

It should be noted that, while the embodiments described herein may be performed under the control of a programmed processor, in alternative embodiments, the embodiments may be fully or partially implemented by any programmable or hardcoded logic, such as field programmable gate arrays (FPGAs), transistor transistor logic (TTL) logic, or application specific integrated circuits (ASICs). Additionally, the embodiments of the present invention may be performed by any combination of programmed general-purpose computer components and/or custom hardware components. Therefore, nothing disclosed herein should be construed as limiting the various embodiments of the present invention to a particular embodiment wherein the recited embodiments may be performed by a specific combination of hardware components.

While the disclosed embodiments are described in specific terms, other embodiments encompassing principles of the invention are also possible. Further, operations may be set forth in a particular order. The order, however, is but one example of the way that operations may be provided. Operations may be rearranged, modified, or eliminated in any particular implementation while still conforming to aspects of the invention. Embodiments within the scope of the present invention also include computer readable media for carrying or having computer-executable instructions or data structures stored thereon. Such computer-readable media may be any available media that can be accessed by a general purpose or special purpose computer. By way of example, and not limitation, such computer-readable media can comprise RAM, ROM, PROM, EPROM, EEPROM, DVD, CD ROM or other optical disk storage, magnetic disk storage or other magnetic storage devices, or any other medium which can be used to carry or store desired program code means in the form of computer-executable instructions or data structures and which can be accessed by a general purpose or special purpose computer. Combinations of the above should also be included within the scope of computer-readable media. Computer-executable instructions comprise, for example, instructions and data which cause a general purpose computer, special purpose computer, or special purpose processing device to perform a certain function or group of functions.

What is claimed is:

1. A computer implemented method for scheduling tasks, comprising:
    receiving a task request from an application, the task requesting execution by a central processing unit (CPU) using a scheduler, the task having a unique task signature associated with the task, the task signature related to a number computed by the scheduler and representing at least one call to a method in an application programming interface (API);
    estimating an execution time for the task based on an at least one execution metric stored in a state model for the application, the state model being representative of a plurality of tasks requested by the application and including a separate state for each task being requested, with each separate state including an information related to a position of an at least one user within the state model when a task is being executed on behalf of the at least one user, the state model further comprising at least edge attached to a first execution state, the at least one edge representative of a transition from the first execution state to a second execution state; and
    scheduling the task for processing on the CPU based on the estimated execution time using the scheduler.

2. The computer implemented method of claim 1, further comprising:
    determining if the signature of the requested task exists in the state model.

3. The computer implemented method of claim 2, wherein if the signature of the requested task is not found in the state model, performing the steps of:
    creating a new state in the state model;
    and associating the signature of the requested task to the new state.

4. The computer implemented method of claim 1, further comprising: adding the task to an execution queue;
    dedicating the estimated execution time for the task to the CPU; and
    upon execution of the task by the CPU, updating the at least one execution metric based on the execution run time of the task by the CPU.

5. The computer implemented method of claim 3, further comprising:
    adding the task to an execution queue without knowledge of an average execution time of the task; and
    upon execution of the task by the CPU, associating at least one execution metric to the new state in the state model.

6. The computer implemented method of claim 1, wherein the state model further comprises a plurality of metrics representing a percentage of times that the at least one edge is followed by a second edge attached to the first execution state.

7. The computer implemented method of claim 6, further comprising: adding a task associated with the second execution state to an execution queue based on at least the percentage of times stored in the state model.

8. The computer implemented method of claim 1, wherein the task signature is generated dynamically.

9. A system for scheduling tasks in a computing environment, comprising:
    a computing application hosted on a first server, the computing application including a plurality of tasks requesting execution by a central processing unit (CPU);

a task scheduler in communication with the computing application, the task scheduler capable of receiving and scheduling the plurality of tasks for execution by the CPU;

a scheduling queue in communication with the scheduler, the scheduling queue capable of storing the plurality of tasks waiting for the execution by the CPU; and a computer implemented state model in communication with the computing application and the task scheduler, the computer implemented state model having a plurality of execution states representative of the plurality of tasks requested by the computing application, wherein each execution state of the state model has an associated task signature, the task signature related to a number computed by the task scheduler, each execution state further including an information related to an at least one user, the information indicative of the task being executed on behalf of the at least one user within the computing application, the state model further having at least a first edge attached to a first execution state, the first edge representative of a transition from the first execution state to a second execution state.

10. The system of claim 9 wherein the state model further comprises:
a plurality of edge metrics representing a percentage of times that the first edge is followed by second edge attached to the first execution state.

11. The system of claim 10, wherein the task scheduler adds a task associated with the second execution state to the scheduling queue based on at least the plurality of edge metrics.

12. The system of claim 9, wherein the task signature of an execution state represents a series of methods called by the computing application.

13. The system of claim 9 wherein the state model further comprises:
a plurality of execution metrics associated with the execution states of the state model, the execution metrics representing the average execution time of the tasks associated with the execution states of the state model.

14. The system of claim 13, wherein the task scheduler estimates the execution time of a task based on at least one execution metric of the plurality of execution metrics.

15. The system of claim 14, wherein the task scheduler adds the task to the scheduling queue based on the estimate of the execution time of the task.

16. The system of claim 9, further comprising: a data storage device in communication with the task scheduler to store the state model.

\* \* \* \* \*